June 19, 1951 F. H. WYATT 2,557,165

GUARD RING FOR PROTECTING GROUND LIGHTS

Filed March 28, 1947 3 Sheets-Sheet 1

INVENTOR.
Frank H. Wyatt
BY
ATTORNEY

June 19, 1951  F. H. WYATT  2,557,165
GUARD RING FOR PROTECTING GROUND LIGHTS
Filed March 28, 1947  3 Sheets-Sheet 2

INVENTOR.
Frank H. Wyatt
BY
ATTORNEY

June 19, 1951  F. H. WYATT  2,557,165
GUARD RING FOR PROTECTING GROUND LIGHTS
Filed March 28, 1947  3 Sheets-Sheet 3

INVENTOR.
Frank H. Wyatt
BY
ATTORNEY

Patented June 19, 1951

2,557,165

UNITED STATES PATENT OFFICE 2,557,165

GUARD RING FOR PROTECTING GROUND LIGHTS

Frank H. Wyatt, San Diego, Calif.

Application March 28, 1947, Serial No. 737,759

1 Claim. (Cl. 240—1.2)

(Granted under the act of March 3, 1883, as amended April 30, 1928; 370 O. G. 757)

This invention relates to guards adapted to be placed around ground lights, particularly runway lights such as are used to mark the edges of airplane runways.

It is an object of this invention to provide an improved guard which will protect a runway light from being crushed or broken when it is run over by even the heaviest airplanes and ground vehicles.

It is another object of this invention to provide such a guard as will adequately protect a runway light, and at the same time will not appreciably block passage of light rays emanating horizontally and vertically from the runway light.

It is a further object of this invention to provide a guard which is particularly adapted for a runway light having a flat, opaque disc which holds the lens, the guard being so designed that it will permit the runway light to be run over by heavy vehicles, and will at the same time permit substantial horizontal and vertical illumination to emanate from the light.

In accordance with this invention, there has been devised a flat ring of strong material such as cast or wrought iron, provided on its upper face with a plurality of radial teeth having sloping upper surfaces to permit vehicles to pass upwardly and over the light without damage to the vehicle tires or to the light. The uppermost end of the teeth are approximately at the level of the flat, opaque dish of the runway light to be protected. The inner, uppermost ends of the teeth, immediately adjacent the light, overhang the inner rim of the ring, so as to increase the degree of mechanical protection afforded the light, and at the same time permit the guard to be placed over an already installed runway light. The spaces between teeth constitute radial grooves spaced evenly in the upper surface of the guard to permit horizontal as well as vertical emanation of light from the runway light. Inasmuch as the ring has a flat bottom so that it may be firmly mounted flush on the ground or cement surrounding the light, one or more radial drainage passages are provided, when the ring is made of cast material, for the escape of water trapped within the ring. These drainage passages conveniently take the form of narrow radial grooves on the under surface of the ring.

In the drawings, three embodiments of this invention are illustrated.

Figure 1:
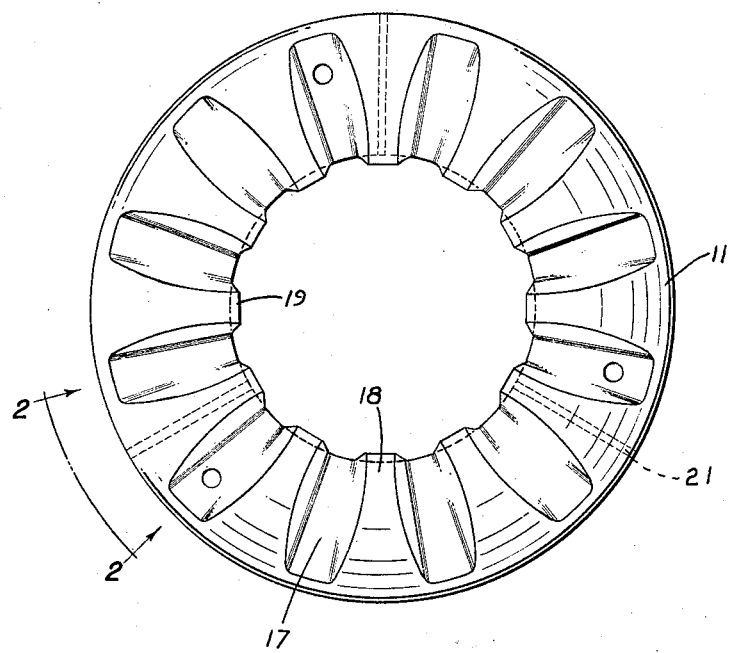
Fig. 1 is a plan view of a preferred embodiment of this invention illustrating the guard alone without the runway light which it protects.
Figure 2:
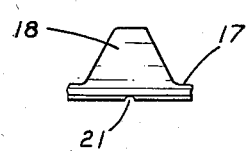
Fig. 2 is a fragmentary side view taken along line 2—2 in Fig. 1 and illustrating particularly one of the radial drainage passages.
Figure 3:
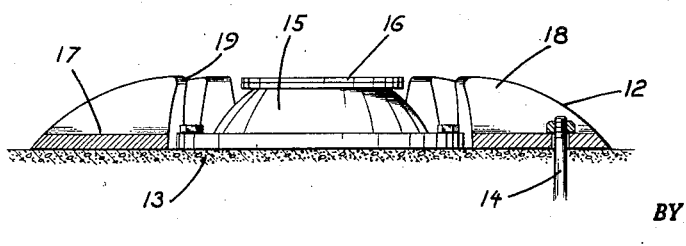
Fig. 3 is a vertical view showing the runway light protected by the guard, the guard itself being sectionalized to illustrate the nature of the teeth disposed thereon.
Figure 4:
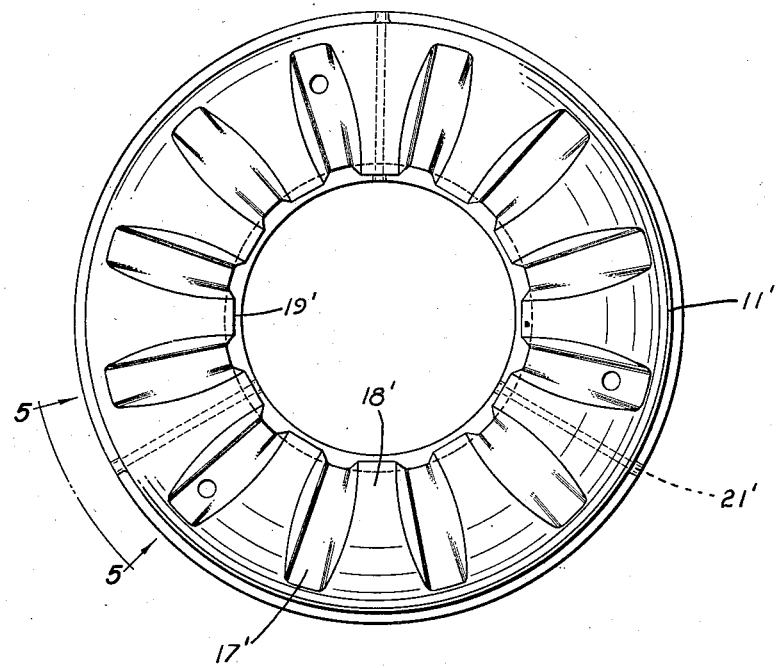
Figure 5:
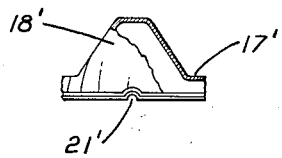
Figure 6:
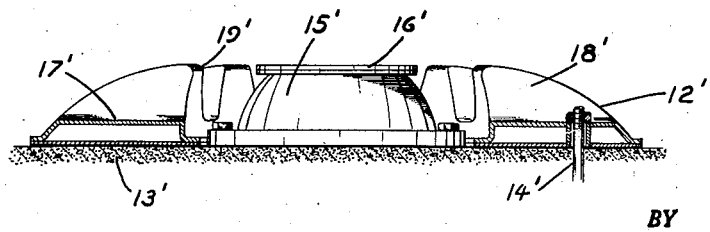

Figs. 4, 5, and 6 are views similar to Figs. 1, 2, and 3, respectively, and illustrates an embodiment of this invention in which the ring is made hollow instead of being formed in a solid piece.

Figure 7:
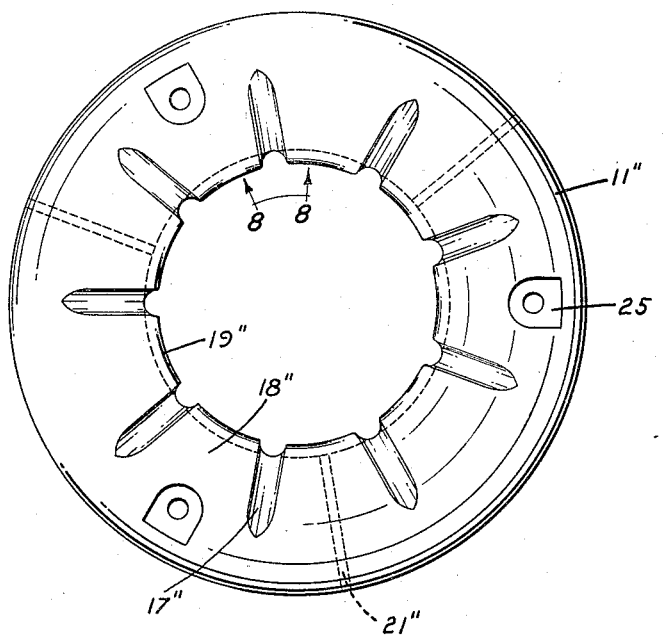
Figure 8:
Figure 9:
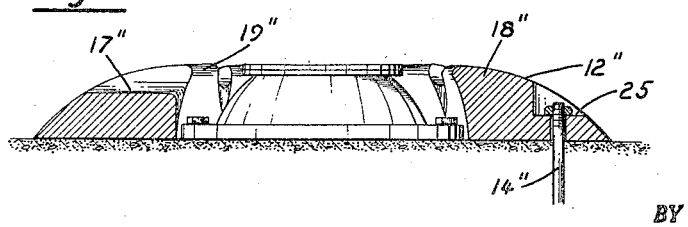

Figs. 7, 8, and 9 are views similar to those of Figs. 1, 2, and 3, and illustrate a third embodiment of this invention. These figures illustrate particularly the characteristic ring-like nature of this invention, from which its mechanical strength is derived.

Referring now to the drawings, 11 designates a solid ring of heavy material which may be die cast of ferrous material such as iron. As best seen in Fig. 3, there are formed integrally on the upper surface of the ring 11 a plurality of radial, equiangularly positioned ridges or teeth 18, the top faces of which are radially convex and slope downwardly as shown at 12, thereby presenting a smooth contour to the tires of vehicles or airplanes. Thus when the guard is run over by a vehicle neither the tires nor the light are harmed. The ring 11 is bolted to concrete 13 by means of a plurality of bolts 14, and it surrounds a conventional runway light 15 such as may be used to mark the edges on an airplane runway. Light 15 is provided with a flat, circular, opaque lens holder disk 16 which is usually made of iron or steel. The primary function of the light 15 is to provide horizontal illumination, so that as the airplane takes off or comes in for a landing the boundary of the runway may be clearly seen. At the same time, the disk 16 is not too large to prevent the upward transmission of narrow annular light rays.

The spaces between the teeth constitute a plurality of radial grooves 17 formed in the upper surface of the guard, which permit emanation of horizontal and vertical annular rays and at the same time maintain the protecting function of the guard. The intercalary radial ridges or teeth 18 are in the form of isosceles trapezoidal prisms, having generally radial side walls slanting outwardly so that the base of the tooth is broader than the upper portion thereof, as shown in Fig. 2. This form lends strength to the teeth and enhances the protecting nature of the guard, while simultaneously permitting maximum light emanation.

As best seen in Fig. 3, the inner ends of the teeth 18 slightly overhang the inner rim of the ring 11, yet terminate substantially short of the ring center, as shown at 19, thereby increasing the protective nature of the ring in the region closest to the light 15, while at the same time permitting the ring 11 to be bolted to concrete 13 after the installation of the light 15. Light from the source 15 may thus emanate upwardly annular circumjacent the disk 16, and also outwardly through the grooves 17.

It will be seen that the bolts 14 mentioned above clamp the ring 11 to the cement 13 at the bottom of the grooves 17.

Inasmuch as, when made of cast material, the ring 11 is provided with a flat bottom for firm seating flush on the concrete 13, water would be trapped within the ring were it not for the provision of a plurality of radial drainage grooves 21 formed on the under surface of the ring as shown in Fig. 2.

A manufacturing modification of the guard shown in Figs. 1, 2, and 3 is illustrated in Figs. 4, 5, and 6, respectively, wherein the ring 11' and teeth 18' are made hollow, being stamped from sheet material into the proper form. The shape and function of this guard are substantially identical with that previously described for the guard of Figs. 1, 2, and 3, and further description appears to be unnecessary. The reference numerals employed in Figs. 4, 5, and 6 are primed to correspond to the similar unprimed numerals in Figs. 1, 2, and 3.

The modification illustrated in Figs. 7, 8, and 9 illustrates particularly the ring-like nature of this invention from which it derives much of its mechanical strength to resist the pounding of heavy vehicles. Double primed numerals indicate the parts of this embodiment corresponding to similar parts of the other embodiments. As shown in Fig. 6 the guard teeth 18" are provided with sloping upper surfaces 12", the same as the other embodiments. The guard is provided with a plurality of radial grooves 17" which are considerably shallower than are the grooves 17 of the ring 11. Likewise there are fewer grooves 17", so that the total effect is to achieve a somewhat stronger ring at the sacrifice of emanated horizontal light.

In this embodiment the securing bolts 14" are not placed in the bottom of the grooves 17", but are set in specially indented flats 25 in certain of the teeth 18".

From the above description, it will be seen that there has been described a guard for ground lights which will protect the light to which it is applied from being crushed by vehicles, and at the same time will permit adequate horizontal and vertical illumination for the guidance of aircraft on, or approaching, a runway.

It will be understood that this invention may be made and utilized in any suitable shape, size, or arrangement, depending upon the object to be accomplished and that various modifications and changes may be made in this invention without departing from the spirit and scope thereof as set forth in the appended claim.

The invention described herein may be manufactured and used by or for the Government of the United States of America for governmental purposes without the payment of any royalties thereon or therefor.

What is claimed is:

A guard for the protection of a ground light comprising a ring having a flat under surface to seat on the ground surface circumjacent the light, and a plurality of radially oriented teeth disposed substantially equiangularly on the upper surface of said ring, each tooth including generally radial side walls slanting outwardly so that the base of the tooth is broader than the upper portion thereof, the upper surface of each of said teeth being radially convex and extending upward from a point adjacent the outer rim of said ring to a point slightly within and overhanging the inner rim of said ring, whereby light is visible through the guard vertically and laterally.

FRANK H. WYATT.

REFERENCES CITED

The following references are of record in the file of this patent:

UNITED STATES PATENTS

| Number | Name | Date |
|---|---|---|
| 1,473,375 | Kyle | Nov. 6, 1923 |
| 1,479,651 | Clements | Jan. 1, 1924 |
| 1,518,678 | Sovereign | Dec. 9, 1924 |
| 2,184,004 | Pennow | Dec. 19, 1939 |
| 2,359,151 | Pennow | Sept. 26, 1944 |